Aug. 12, 1969     J. E. STEINHELPER, JR     3,461,458

METHOD OF JOINING TWO SURFACES

Original Filed Oct. 18, 1962

*INVENTOR.*
JOHN E. STEINHELPER, JR

BY

*Richard J. Seeger*
ATTORNEY

United States Patent Office 3,461,458
Patented Aug. 12, 1969

3,461,458
METHOD OF JOINING TWO SURFACES
John E. Steinhelper, Jr., Detroit, Mich., assignor to The Bendix Corporation, a corporation of Delaware
Original application Oct. 18, 1962, Ser. No. 231,420, now Patent No. 3,231,795, dated Jan. 25, 1966. Divided and this application May 28, 1965, Ser. No. 495,740
Int. Cl. B23k *31/02, 35/38*
U.S. Cl. 29—494         1 Claim

ABSTRACT OF THE DISCLOSURE

In a process of assembling a sealed chamber by brazing together two portions of the chamber, the step of reducing the pressure exterior of the chamber as the assembly cools to prevent a pressure differential across the brazed portion thereby preventing blow holes.

---

This invention pertains to a low inductance and low capacitance cartridge for holding an electrical element under spring pressure which is constructed to minimize the effect of the spring inductance and capacitance and its method of manufacture.

This application is a divisional of my copending application Ser. No. 231,420 filed Oct. 18, 1962, and entitled, "Low Inductance and Capacitance Electrical Cartridge and Method of Manufacture," now Patent No. 3,231,795.

It is an object of this invention to provide a low inductance cartridge for an electrical element such as a mesa diode which has a symmetrical spring member such as a bellows spring, for causing a pressure contact between the electrical element and the cartridge cover which is otherwise insulated from the electrical element. Use of a symmetrical spring member such as a bellows spring provides a low cartridge inductance, for example a maximum of two tenths nanohenry, low cartridge capacitance, for example three tenths picofarad, even in an exceptionally small cartridge such as one having a total volume of one ten thousandths of a cubic inch. In addition, such a cartridge is of extremely rugged design.

A further object is the method of fluxing in a sealed volume wherein hydrogen is used as the flux because hydrogen vapors are substantially more inert than the vapors of conventional solder fluxes.

A still further object of this invention is a method of fluxing in a sealed volume wherein the pressure exteriorally of the volume is reduced prior to freezing of the solder so that the contracting vapors inside of the volume do not create a pressure differential across the freezing solder which would draw gas through the solder thereby causing blow holes.

These and other objects will become more apparent when a preferred embodiment of this invention is considered in connection with the drawings in which.

Figure 1:
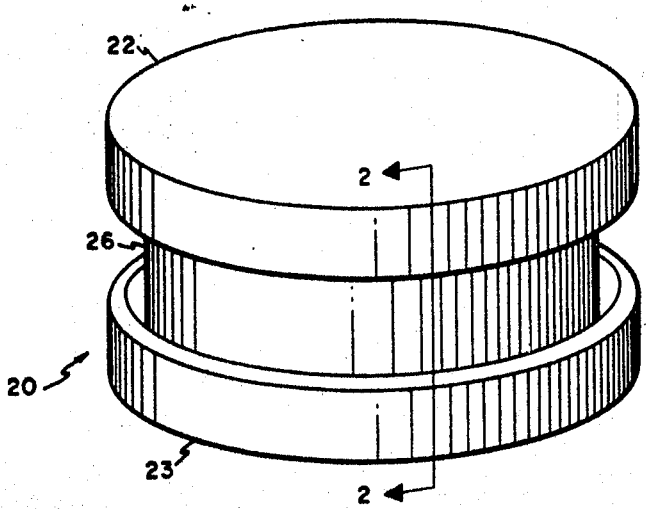
FIGURE 1 is a view in perspective of a preferred embodiment of this invention.

Shown in FIGURE 1 is a perspective view of a cartridge 20 having a cover 22 and a support 23. Cover 22 has an annular groove 24 formed therein and cover 23 has an annular groove 25 similar to and opposed to groove 24. Covers 22 and 23 are made of tellurium copper and are spaced apart by an insulative cylinder 26 which is soldered at its ends in the grooves 24 and 25. Cylinder 26 in this preferred embodiment is a ceramic material having approximately 99 percent alumina ($Al_2O_3$).

Figure 2:
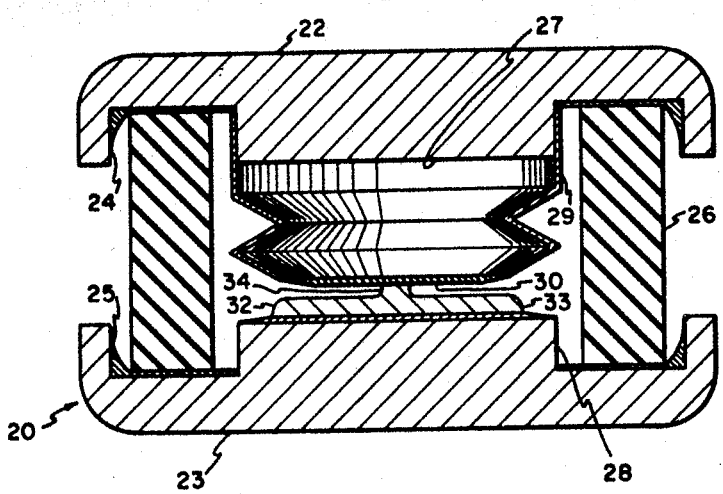
FIGURE 2 is a section taken at 2—2 of FIGURE 1.
Figure 3:
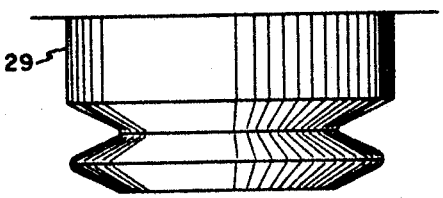
FIGURE 3 is an elevational view of the bellows spring used in this invention.

Shown in FIGURE 2 of the drawing is post 27 in cover 22 which is defined by the inner walls of annular groove 24 and centrally disposed of support 23 is post 28 which is defined by the inner walls of annular groove 25. A bellows spring 29 which is made of gold-plated nickel is fitted over post 27 and soldered thereto at one end and has a copper disc 30 soldered to the other end thereof. In this embodiment the bellows spring 29 has a wall thickness of .0003 inch and is extremely flexible. The spring 29 is perfectly symmetrical about the center line of the cartridge 20 giving the aforementioned low inductance and the capacitance values.

Post or boss 28 has a gold plate 32 coated or formed thereon and a silicon die 33 having a mesa 34 is soldered to boss 28. This places mesa 34 in spring contact with plate 30 providing an exceptionally low sprung mass on mesa 34 and therefore any vibration, shock, or acceleration will not place any large stress or strain on the silicon mesa 34.

In the manufacture of the above device, a solder washer is placed in each of annular grooves 24 and 25, while disc 30 is precoated with solder and the base portion of die 33 is precoated with solder. The parts are then assembled and the assembly is placed in a furnace where the oxygen is forced out by feeding nitrogen into the furnace several times and after each time drawing a vacuum on the furnace. Hydrogen is then fed into the furnace and reduces the oxides on the surfaces of all of the components hence acting as a flux. The hydrogen flow through the furnace is at two cubic feet per hour. The furnace temperature is regulated at 370° centigrade and held to plus or minus five degrees centigrade of that temperature for five minutes. After five minutes, the hydrogen flow is stopped and according to an object of this invention, a vacuum is drawn on the furnace to prevent large pressure differential across the molten solder while it is freezing thereby preventing any bubbling through the solder and eliminating resultant blow holes.

A further object of this invention is realized since hydrogen is used as the flux, and the hydrogen vapors trapped in the cartridge are substantially inert while the vapors of conventional solder fluxes are chemically harmful to the cartridge parts.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. The method of joining two parts having surfaces mutually adapted to be joined to provide a substantially sealed volume comprising the steps of:

assembling the parts to be joined thereby defining said volume;

introducing a meltable bonding material to the surfaces to be joined;

placing said assembled parts in a chamber;

heating said assembled parts to a temperature sufficient to cause melting of said bonding material to seal said volume;

cooling said assembled parts and reducing the pressure in said chamber prior to freezing of the bonding material to prevent a pressure differential across the bonding material due to contracting vapors inside of said volume sufficient to cause gas flow through the bonding material.

References Cited

UNITED STATES PATENTS

| | | | |
|---|---|---|---|
| 2,978,806 | 4/1961 | Herbert | 29—494 X |
| 3,011,254 | 12/1961 | Melill | 29—494 X |
| 3,069,766 | 12/1962 | Rush | 29—494 X |
| 3,083,451 | 4/1963 | Atkinson | 29—494 X |
| 3,091,845 | 6/1963 | Herman | 29—497 X |
| 3,271,852 | 9/1966 | Long | 29—494 |

FOREIGN PATENTS 824,256 11/1959 Great Britain.

JOHN F. CAMPBELL, Primary Examiner

J. L. CLINE, Assistant Examiner

U.S. Cl. X.R.

29—487, 500